United States Patent
Fukuyama et al.

(10) Patent No.: US 10,926,337 B2
(45) Date of Patent: Feb. 23, 2021

(54) CUTTING-OFF PROCESSING TOOL

(71) Applicant: SUMITOMO ELECTRIC HARDMETAL CORP., Itami (JP)

(72) Inventors: Tomoyuki Fukuyama, Itami (JP); Junya Okida, Sorachi-gun (JP); Yosuke Shimamoto, Sorachi-gun (JP)

(73) Assignee: Sumitomo Electric Hardmetal Corp., Itami (JP)

( * ) Notice: Subject to any disclaimer, the term of this patent is extended or adjusted under 35 U.S.C. 154(b) by 129 days.

(21) Appl. No.: 16/304,788

(22) PCT Filed: Oct. 30, 2017

(86) PCT No.: PCT/JP2017/039114
§ 371 (c)(1),
(2) Date: Nov. 27, 2018

(87) PCT Pub. No.: WO2018/084110
PCT Pub. Date: May 11, 2018

(65) Prior Publication Data
US 2019/0232378 A1 Aug. 1, 2019

(30) Foreign Application Priority Data
Nov. 7, 2016 (JP) .............................. JP2016-217453

(51) Int. Cl.
*B32B 27/04* (2006.01)
*B23B 27/04* (2006.01)
*B23B 27/22* (2006.01)

(52) U.S. Cl.
CPC ............ *B23B 27/04* (2013.01); *B23B 27/045* (2013.01); *B23B 27/22* (2013.01)

(58) Field of Classification Search
CPC ....... B32B 27/04; B32B 27/045; B32B 27/22; B32B 2200/20; B32B 2200/32
See application file for complete search history.

(56) References Cited

U.S. PATENT DOCUMENTS 4,778,311 A * 10/1988 Niemi .................. B23B 27/045 407/116
5,135,336 A * 8/1992 Noguchi ............... B23B 27/045 407/117

(Continued)

FOREIGN PATENT DOCUMENTS

FR 2483820 A1 * 12/1981 ............. B23B 27/04
WO 2014/065046 A1 5/2014

OTHER PUBLICATIONS

English translation of FR 2483820, 1981 (Year: 1981).*

*Primary Examiner* — Alan Snyder
(74) *Attorney, Agent, or Firm* — Baker Botts L.L.P.; Michael A. Sartori (57) ABSTRACT

The upper surface includes a first breaker projection face extending along the first side surface, a second breaker projection face extending along the second side surface, and a rake face located between the first breaker projection face and the second breaker projection face in top view. In a direction from the rear surface to the front surface, a first front end of the first breaker projection face is located ahead of a second front end of the second breaker projection face. A cutting edge has a first cutting edge portion and a second cutting edge portion. In a direction perpendicular to the reference surface, the second breaker projection face is lower than the first breaker projection face, and a boundary between the first cutting edge portion and the second cutting edge portion is lower than the second breaker projection face.

16 Claims, 9 Drawing Sheets

(56) References Cited

U.S. PATENT DOCUMENTS

| | | | | |
|---|---|---|---|---|
| 5,137,396 | A | * | 8/1992 | Durschinger ......... B23B 27/045 407/116 |
| 7,883,300 | B1 | * | 2/2011 | Simpson, III ......... B23B 27/045 407/113 |
| 8,366,355 | B2 | * | 2/2013 | Nagaya ................... B23B 27/04 407/113 |
| D861,754 | S | * | 10/2019 | Fukuyama ................... D15/139 |
| 2001/0014259 | A1 | * | 8/2001 | Inayama ............... B23B 27/045 407/116 |
| 2015/0056029 | A1 | | 2/2015 | Shimamoto et al. |

* cited by examiner

FIG.11

CUTTING-OFF PROCESSING TOOL

TECHNICAL FIELD

The present disclosure relates to cutting-off processing tools. The present application claims priority to Japanese Patent Application No. 2016-217453 filed on Nov. 7, 2016, the entire contents of which are incorporated herein by reference.

BACKGROUND ART

WO 2014/065046 (PTD 1), for example, discloses a cutting-off processing tool which includes a cutting edge having an end cutting edge angle.

CITATION LIST

Patent Document

PTD 1: WO 2014/065046

SUMMARY OF INVENTION

A cutting-off processing tool according to one embodiment of the present disclosure includes an upper surface, a front surface, a rear surface, a first side surface, a second side surface, and a reference surface. The front surface is continuous with the upper surface. The rear surface is opposite to the front surface. The first side surface is continuous with both the upper surface and the front surface. The second side surface is continuous with both the upper surface and the front surface, and opposite to the first side surface. The reference surface is opposite to the upper surface, and has a planar shape. The upper surface includes a first breaker projection face extending along the first side surface, a second breaker projection face extending along the second side surface, and a rake face located between the first breaker projection face and the second breaker projection face in top view. A ridgeline between the rake face and the front surface includes a cutting edge. In a direction from the rear surface to the front surface, a first front end of the first breaker projection face is located ahead of a second front end of the second breaker projection face. The cutting edge has a first cutting edge portion continuous with the first breaker projection face and inclined relative to the reference surface, and a second cutting edge portion continuous with both the first cutting edge portion and the second breaker projection face and inclined relative to the reference surface. In a direction perpendicular to the reference surface, the second breaker projection face is lower than the first breaker projection face, and a boundary between the first cutting edge portion and the second cutting edge portion is lower than the second breaker projection face.

DETAILED DESCRIPTION

Problem to be Solved by the Present Disclosure

When processing a workpiece using the cutting-off processing tool disclosed in WO 2014/065046, however, a processed surface of the workpiece may be damaged.

An object of one embodiment of the present disclosure is to provide a cutting-off processing tool capable of suppressing damage to a processed surface of a workpiece.

Advantageous Effect of the Present Disclosure

According to one embodiment of the present disclosure, a cutting-off processing tool capable of suppressing damage to a processed surface of a workpiece can be provided.

Summary of Embodiments of the Present Disclosure

First, a summary of embodiments of the present disclosure is provided.

(1) A cutting-off processing tool 100 according to one embodiment of the present disclosure includes an upper surface 20, a front surface 5, a rear surface 6, a first side surface 11, a second side surface 12, and a reference surface 13. Front surface 5 is continuous with upper surface 20. Rear surface 6 is opposite to front surface 5. First side surface 11 is continuous with both upper surface 20 and front surface 5. Second side surface 12 is continuous with both upper surface 20 and front surface 5, and opposite to first side surface 11. Reference surface 13 is opposite to upper surface 20, and has a planar shape. Upper surface 20 includes a first breaker projection face 21 extending along first side surface 11, a second breaker projection face 22 extending along second side surface 12, and a rake face 23 located between first breaker projection face 21 and second breaker projection face 22 in top view. A ridgeline between rake face 23 and front surface 5 includes a cutting edge 10. In a direction from rear surface 6 to front surface 5, a first front end 31 of first breaker projection face 21 is located ahead of a second front end 32 of second breaker projection face 22. Cutting edge 10 has a first cutting edge portion 1 continuous with first breaker projection face 21 and inclined relative to reference surface 13, and a second cutting edge portion 2 continuous with both first cutting edge portion 1 and second breaker projection face 22 and inclined relative to reference surface 13. In a direction perpendicular to reference surface 13, second front end 32 is lower than first front end 31, and a boundary 3 between first cutting edge portion 1 and second cutting edge portion 2 is lower than second front end 32.

Figure 11:
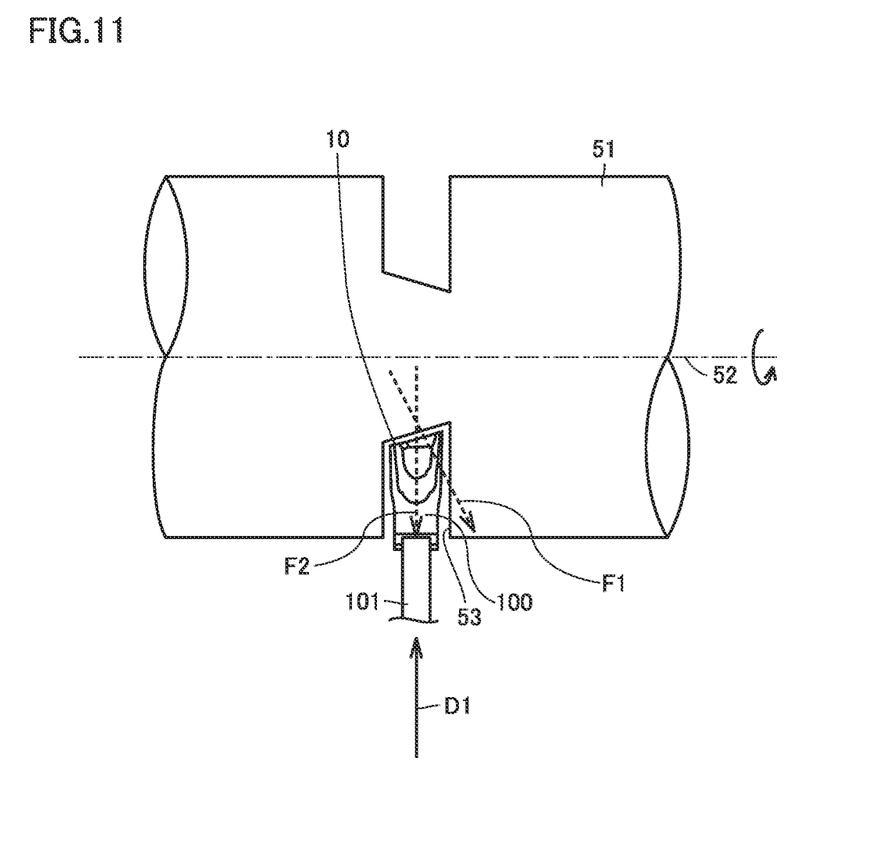
FIG. 11 illustrates a method of using the cutting-off processing tool.

As shown in FIG. 11, when cutting a workpiece 51 using cutting-off processing tool 100, cutting-off processing tool 100 is moved in a direction perpendicular to an axis of rotation 52 of workpiece 51 (cutting-off direction D1), to thereby cut workpiece 51. A direction in which cutting-off processing tool 100 moves closer to workpiece 51 is herein referred to as forward, and an opposite direction thereto is referred to as rearward. Processing of workpiece 51 using cutting-off processing tool 100 causes swarf of workpiece 51 to be produced. Usually the swarf is evacuated in a direction F1 perpendicular to a direction in which cutting edge 10 extends. In this case, the swarf may come into contact with a processed surface 53 of workpiece 51, and damage this surface 53.

In accordance with cutting-off processing tool 100 according to one embodiment of the present disclosure, second front end 32 is lower than first front end 31 in the direction perpendicular to reference surface 13. This facilitates the evacuation of the swarf in a direction from first cutting edge portion 1 to second cutting edge portion 2. As a result, the swarf is evacuated along a direction F2 parallel to cutting-off direction D1. Thus, damage to processed surface 53 of workpiece 51 can be suppressed. Accordingly, the quality of the processed surface can be improved.

(2) In cutting-off processing tool 100 according to (1) described above, first breaker projection face 21 may have a first upper end face 33 having a planar shape, and second breaker projection face 22 may have a second upper end face 34 having a planar shape. A width of first upper end face 33 in a direction perpendicular to a ridgeline between first upper end face 33 and first side surface 11 may be greater than a width of second upper end face 34 in a direction perpendicular to a ridgeline between second upper end face 34 and second side surface 12.

When processing the workpiece using the cutting-off processing tool, higher stress is applied to first upper end face 33 than to second upper end face 34. By setting the width of first upper end face 33 to be greater than the width of second upper end face 34, the rigidity of the first breaker projection can be made higher than the rigidity of the second breaker projection. As a result, breakage of the first breaker projection can be suppressed.

(3) In cutting-off processing tool 100 according to (2) described above, a value obtained by dividing the width of first upper end face 33 by the width of second upper end face 34 may be greater than 1.0 and smaller than 2.5.

(4) In cutting-off processing tool 100 according to any one of (1) to (3) described above, in a direction parallel to front surface 5 and parallel to reference surface 13, a width of first cutting edge portion 1 may be greater than a width of second cutting edge portion 2.

(5) In cutting-off processing tool 100 according to (4) described above, a value obtained by dividing the width of first cutting edge portion 1 by the width of second cutting edge portion 2 may be greater than 1.2 and smaller than 6.0.

(6) In cutting-off processing tool 100 according to any one of (1) to (5) described above, a first inclination angle θ1 of first cutting edge portion 1 relative to reference surface 13 may be smaller than a second inclination angle θ2 of second cutting edge portion 2 relative to reference surface 13. This further facilitates the evacuation of the swarf in the direction from first cutting edge portion 1 to second cutting edge portion 2. As a result, damage to the processed surface of workpiece 51 can be further suppressed.

(7) In cutting-off processing tool 100 according to (6) described above, a value obtained by dividing second inclination angle θ2 by first inclination angle θ1 may be greater than 1.2 and smaller than 5.0.

(8) In cutting-off processing tool 100 according to any one of (1) to (7) described above, a distance H between first front end 31 and second front end 32 in the direction perpendicular to reference surface 13 may be greater than 0.06 mm and smaller than 0.6 mm.

(9) In cutting-off processing tool 100 according to any one of (1) to (8) described above, rake face 23 may have a first rake face portion 41 continuous with first cutting edge portion 1. In a cross section CS1 parallel to the direction from rear surface 6 to front surface 5 and perpendicular to reference surface 13, an inclination angle φ1 of first rake face portion 41 relative to reference surface 13 may be greater than 5° and smaller than 50°.

(10) In cutting-off processing tool 100 according to any one of (1) to (8) described above, rake face 23 may have a second rake face portion 42 continuous with second cutting edge portion 2. In a cross section CS2 parallel to the direction from rear surface 6 to front surface 5 and perpendicular to reference surface 13, an inclination angle φ2 of second rake face portion 42 relative to reference surface 13 may be greater than 5° and smaller than 40°.

Details of Embodiments of the Present Disclosure

Next, the details of the embodiments of the present disclosure are described based on the drawings. The same or corresponding parts are designated by the same reference numbers in the following drawings, and description thereof will not be repeated. At least portions of structures of the embodiments described below may be combined in any manner.

First Embodiment

First, the structure of a cutting-off processing tool according to a first embodiment is described.

Figure 1:
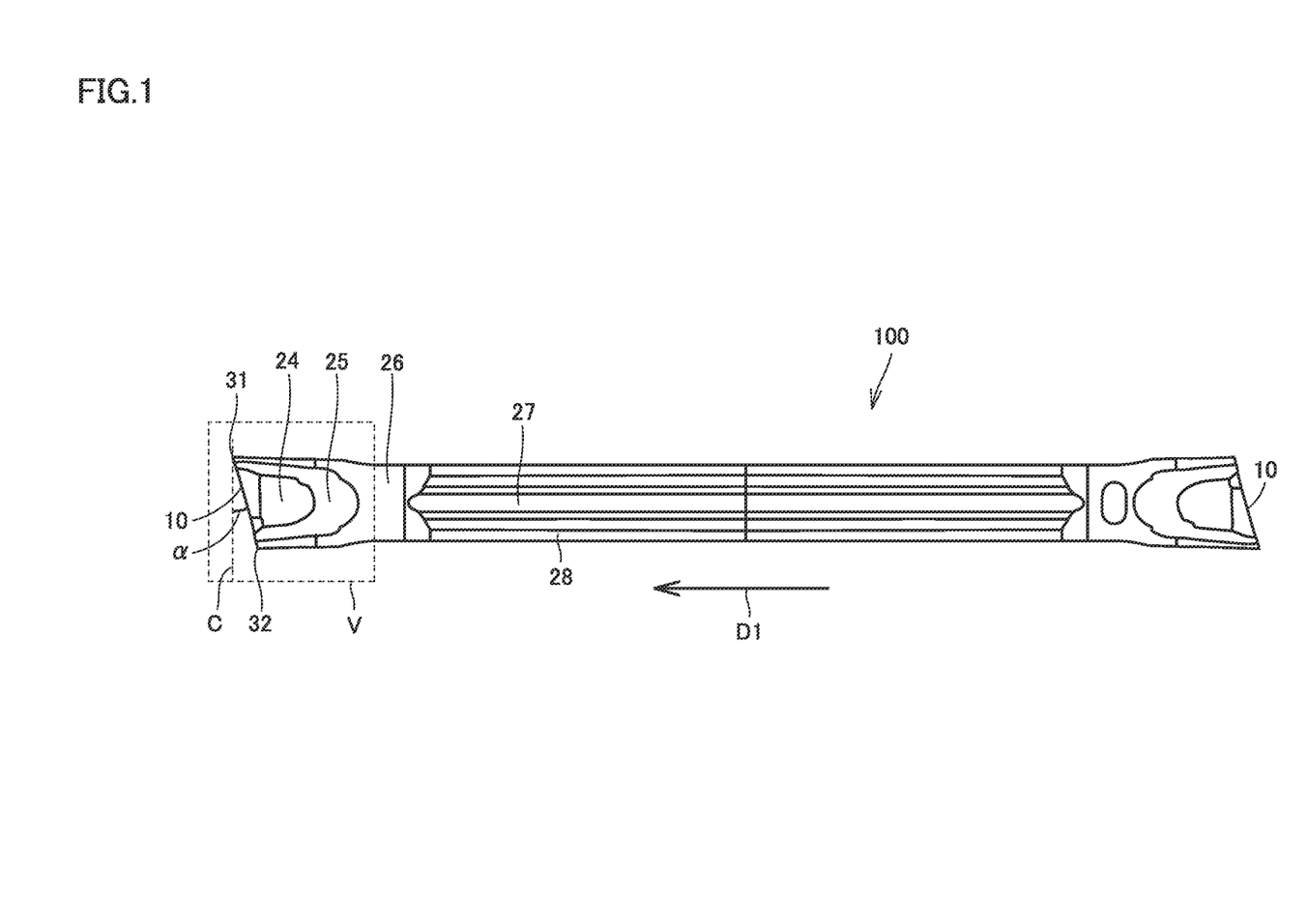
FIG. 1 is a schematic plan view showing the structure of a cutting-off processing tool according to a first embodiment.
Figure 2:
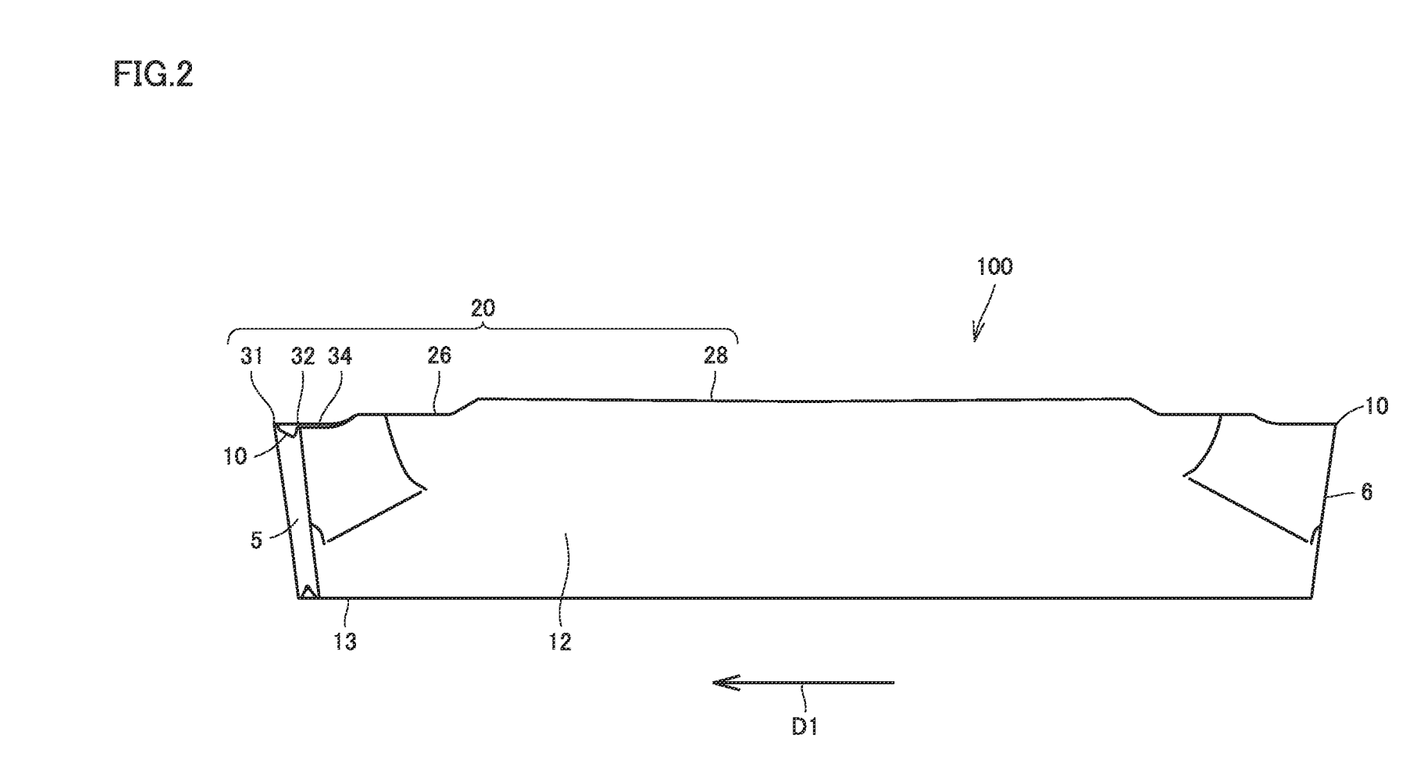
FIG. 2 is a schematic side view showing the structure of the cutting-off processing tool according to the first embodiment.
Figure 3:
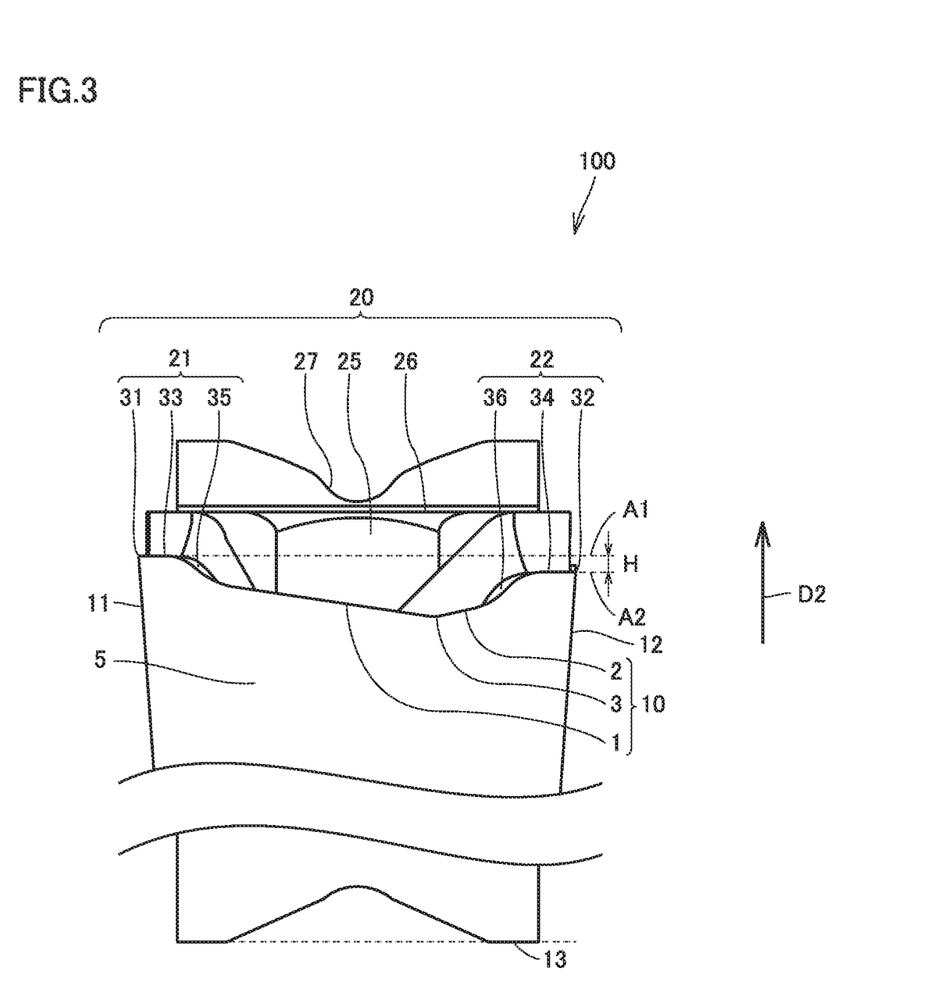
FIG. 3 is a schematic front view showing the structure of the cutting-off processing tool according to the first embodiment.
Figure 4:
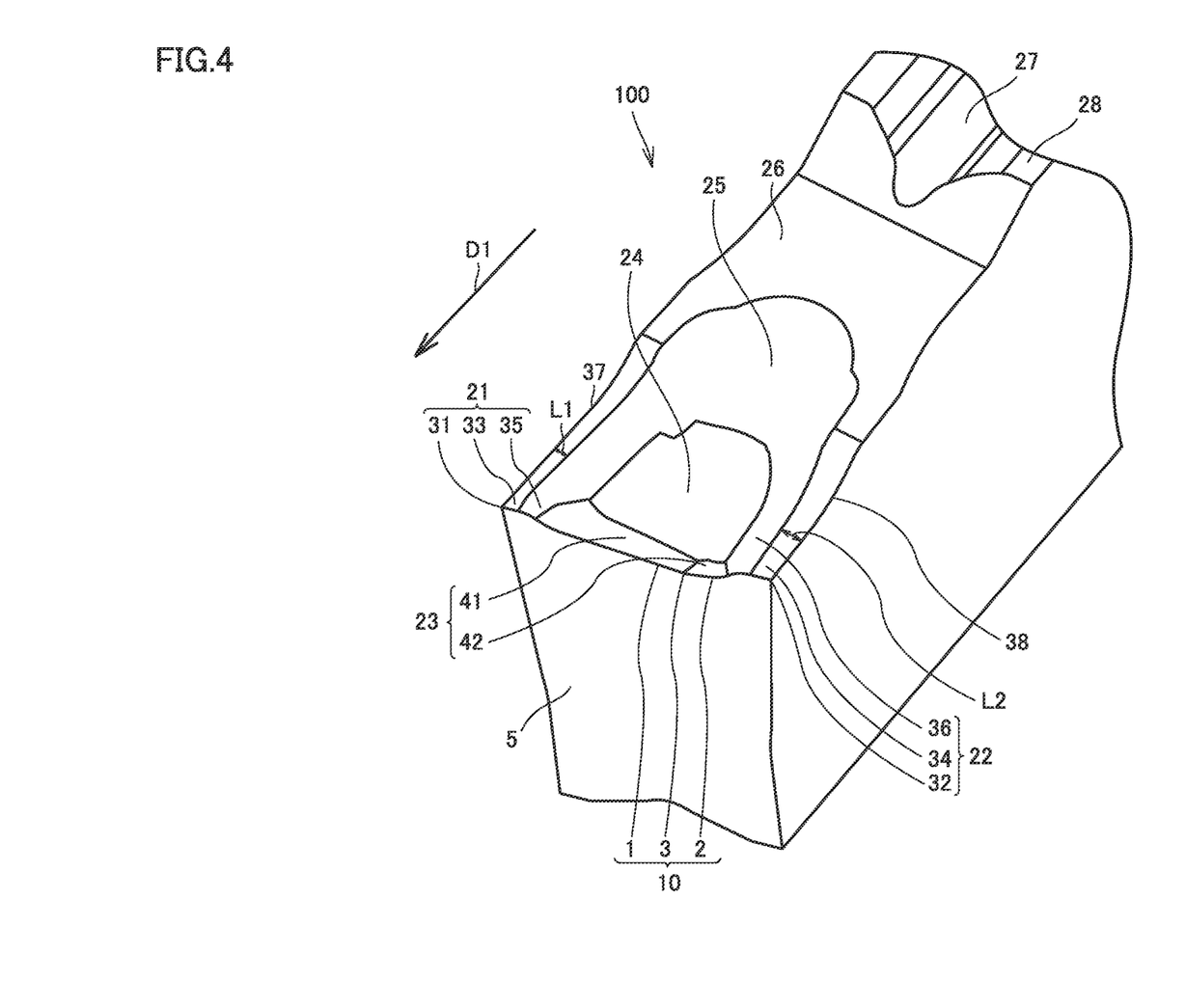
FIG. 4 is a partially enlarged schematic perspective view showing the structure of the cutting-off processing tool according to the first embodiment.

As shown in FIGS. 1 to 5, a cutting-off processing tool 100 according to the first embodiment mainly has an upper surface 20, a front surface 5, a rear surface 6, a first side surface 11, a second side surface 12, and a reference surface 13. As shown in FIG. 2, front surface 5 and rear surface 6 are continuous with upper surface 20. Rear surface 6 is opposite to front surface 5. As shown in FIG. 3, first side surface 11 is continuous with both upper surface 20 and front surface 5. As shown in FIGS. 3 and 4, second side surface 12 is continuous with both upper surface 20 and front surface 5. Second side surface 12 is opposite to first side surface 11. Reference surface 13 is opposite to upper surface 20. As shown in FIGS. 2 and 3, reference surface 13 has a planar shape. Reference surface 13 is a seating surface, for example, but is not limited to be a seating surface.

Figure 5:
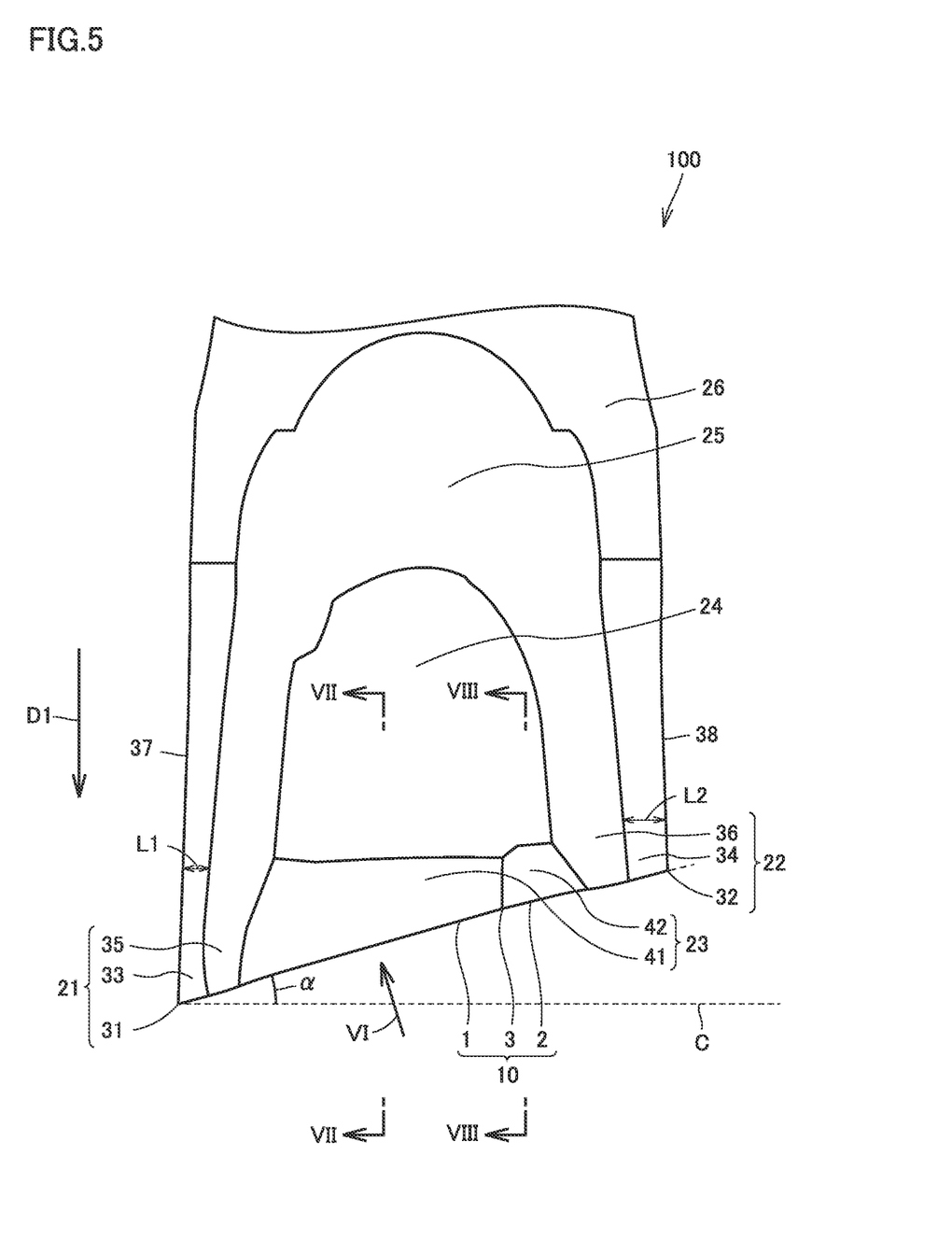
FIG. 5 is an enlarged view of a region V of FIG. 1

As shown in FIGS. 3 to 5, upper surface 20 mainly has a first breaker projection face 21, a second breaker projection face 22, a rake face 23, a bottom face 24, a rear inclined face 25, a first plane 26, a valley face 27, and a second plane 28. First breaker projection face 21 extends along first side surface 11. Second breaker projection face 22 extends along second side surface 12. Rake face 23 is located between first breaker projection face 21 and second breaker projection face 22 in top view (view as seen from a direction perpendicular to the reference surface). A ridgeline between rake face 23 and front surface 5 includes a cutting edge 10.

Bottom face 24 has a substantially planar shape, and is located across rake face 23 from cutting edge 10. Stated another way, rake face 23 is located between cutting edge 10 and bottom face 24 in top view. Bottom face 24 is continuous with rake face 23. Rear inclined face 25 is located across bottom face 24 from rake face 23. Rear inclined face 25 is continuous with bottom face 24. Rear inclined face 25 may be increased in height as distance from cutting edge 10 increases. First plane 26 is located across rear inclined face 25 from bottom face 24. First plane 26 is continuous with rear inclined face 25.

As shown in FIG. 5, in a direction D1 from rear surface 6 to front surface 5, a first front end 31 of first breaker projection face 21 is located ahead of a second front end 32 of second breaker projection face 22. Direction D1 from rear surface 6 to front surface 5 is a direction in which cutting-off processing tool 100 is moved when a cutting-off process is performed on a workpiece (cutting-off direction D1 (see FIG. 11)). In top view, an angle α formed between cutting edge 10 and a plane C which passes through first front end 31 and is perpendicular to direction D1 from rear surface 6 to front surface 5 is 15°, for example. Angle α may be 8° or more and 15° or less, for example.

Cutting edge 10 has a first cutting edge portion 1 and a second cutting edge portion 2. First cutting edge portion 1 is continuous with first breaker projection face 21. As shown in FIG. 3, first cutting edge portion 1 is inclined relative to reference surface 13. Second cutting edge portion 2 is continuous with both first cutting edge portion 1 and second breaker projection face 22. Second cutting edge portion 2 is located between first cutting edge portion 1 and second breaker projection face 22 in top view. As shown in FIG. 3, second cutting edge portion 2 is inclined relative to reference surface 13. As shown in FIG. 5, rake face 23 has a first rake face portion 41 continuous with first cutting edge portion 1, and a second rake face portion 42 continuous with second cutting edge portion 2.

As shown in FIG. 3, second front end 32 is lower than first front end 31 in a direction D2 perpendicular to reference surface 13. The term "height" as used herein refers to a distance from reference surface 13 in the direction perpendicular to reference surface 13. That is, second front end 32 being lower than first front end 31 means that second front end 32 is at a position lower than that of first front end 31 when seen from reference surface 13. Stated another way, in direction D2 perpendicular to reference surface 13, the distance between second front end 32 and reference surface 13 is shorter than the distance between first front end 31 and reference surface 13. A distance H between first front end 31 and second front end 32 in direction D2 perpendicular to reference surface 13 is greater than 0.06 mm and smaller than 0.6 mm, for example. Distance H may be greater than 0.12 mm and smaller than 0.3 mm. In the present embodiment, distance H is a distance between a plane A1 including a first upper end face 33 and a plane A2 including a second upper end face 34. First upper end face 33 is located higher than second upper end face 34. First plane 26 is located higher than first upper end face 33.

In direction D2 perpendicular to reference surface 13, a boundary 3 between first cutting edge portion 1 and second cutting edge portion 2 is lower than second front end 32. First cutting edge portion 1 is inclined relative to reference surface 13 so as to be increased in height toward first breaker projection face 21. Second cutting edge portion 2 is inclined relative to reference surface 13 so as to be increased in height toward second breaker projection face 22. In direction D2 perpendicular to reference surface 13, boundary 3 between first cutting edge portion 1 and second cutting edge portion 2 is the lowest position of first cutting edge portion 1, and is the lowest position of second cutting edge portion 2.

As shown in FIGS. 4 and 5, first breaker projection face 21 has first upper end face 33 and a first inclined face 35. First upper end face 33 has a planar shape. First upper end face 33 is continuous with a first ridgeline 37. First inclined face 35 is continuous with both first upper end face 33 and rake face 23. First inclined face 35 is located between first upper end face 33 and rake face 23 in top view. First inclined face 35 is inclined relative to reference surface 13 so as to be increased in height toward first upper end face 33. Similarly, second breaker projection face 22 has second upper end face 34 and a second inclined face 36. Second upper end face 34 has a planar shape. Second upper end face 34 is continuous with a second ridgeline 38. Second inclined face 36 is continuous with both second upper end face 34 and rake face 23. Second inclined face 36 is located between second upper end face 34 and rake face 23 in top view. Second inclined face 36 is inclined relative to reference surface 13 so as to be increased in height toward second upper end face 34.

Figure 6:
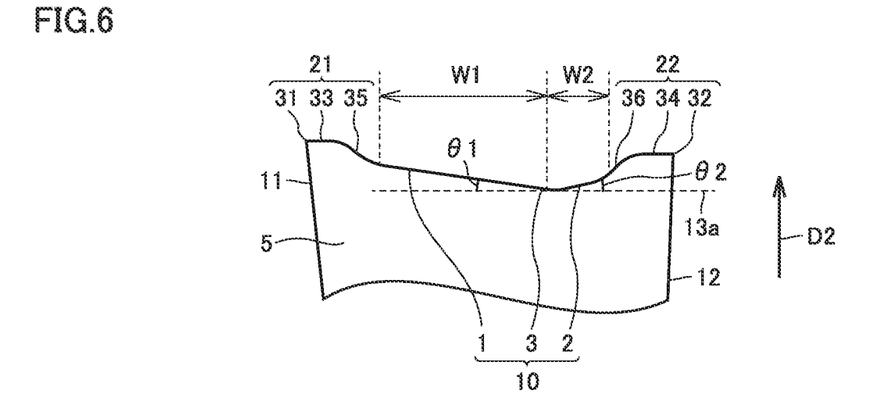
FIG. 6 is a schematic end view as seen from an arrow VI of FIG. 5. Arrow VI represents a direction perpendicular to a direction in which a cutting edge extends.

FIG. 6 is an end view of front surface 5 as seen from a direction perpendicular to a direction in which cutting edge 10 extends in top view. As shown in FIG. 6, in a direction parallel to front surface 5 and parallel to reference surface 13, a width W1 of first cutting edge portion 1 may be greater than a width W2 of second cutting edge portion 2. A value obtained by dividing width W1 of first cutting edge portion 1 by width W2 of second cutting edge portion 2 may be greater than 1.2 and smaller than 6.0. The value obtained by dividing width W1 of first cutting edge portion 1 by width W2 of second cutting edge portion 2 may be greater than 1.5 and smaller than 2.0. Width W1 of first cutting edge portion 1 is 1.2 mm or more and 1.8 mm or less, for example. Width W2 of second cutting edge portion 2 is 0.3 mm or more and 0.9 mm or less, for example. Boundary 3 between first cutting edge portion 1 and second cutting edge portion 2 is located closer to second side surface 12 than an intermediate position between first side surface 11 and second side surface 12.

As shown in FIG. 6, a first inclination angle $\theta 1$ of first cutting edge portion 1 relative to a plane 13a parallel to reference surface 13 may be smaller than a second inclination angle $\theta 2$ of second cutting edge portion 2 relative to plane 13a parallel to reference surface 13. A value obtained by dividing second inclination angle $\theta 2$ by first inclination angle $\theta 1$ may be greater than 1.2 and smaller than 5.0. The value obtained by dividing second inclination angle $\theta 2$ by first inclination angle $\theta 1$ may be greater than 1.5 and smaller than 3.0. First inclination angle $\theta 1$ is 5°, for example. First inclination angle $\theta 1$ may be 3° or more and 10° or less, for example. Second inclination angle $\theta 2$ is 10°, for example. Second inclination angle $\theta 2$ may be 5° or more and 30° or less, for example.

Figure 7:
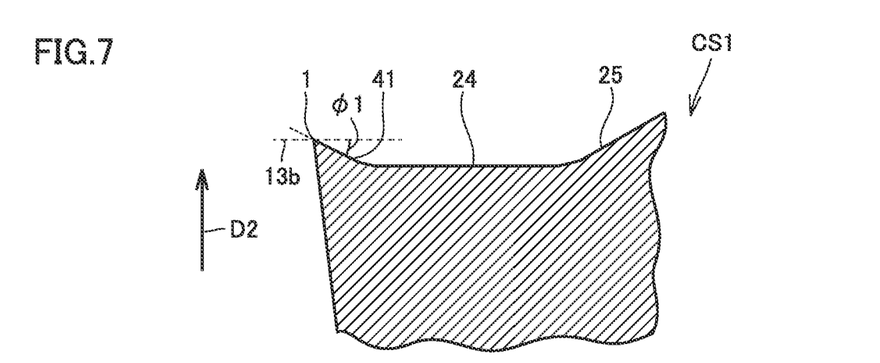
FIG. 7 is a schematic end view taken along a line VII-VII in a direction of arrows of FIG. 5.

As shown in FIG. 7, in a cross section CS1 parallel to the direction from rear surface 6 to front surface 5 and perpendicular to reference surface 13, an inclination angle $\varphi 1$ of first rake face portion 41 relative to a plane 13b parallel to reference surface 13 is greater than 5° and smaller than 50°, for example. Inclination angle $\varphi 1$ of first rake face portion 41 may be greater than 10° and smaller than 40°. First rake face portion 41 is inclined relative to reference surface 13 so as to be decreased in height as distance from first cutting edge portion 1 increases. Bottom face 24 is lower than first cutting edge portion 1 in direction D2 perpendicular to reference surface 13.

Figure 8:
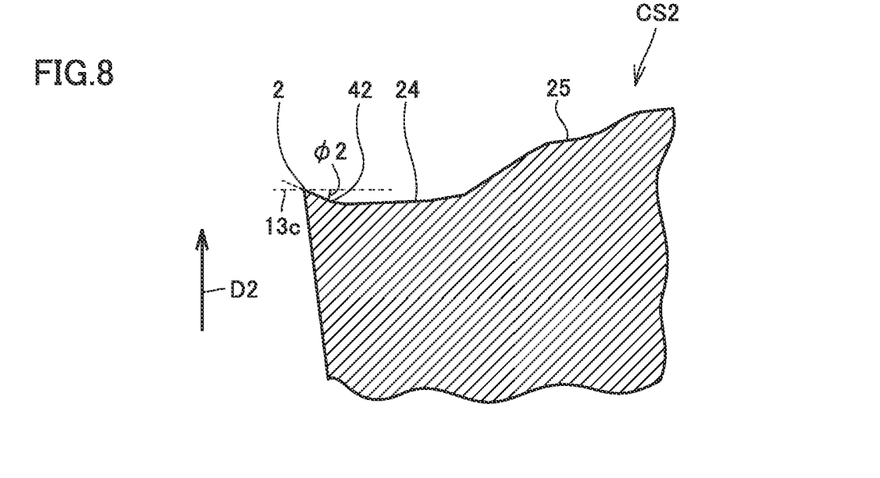
FIG. 8 is a schematic end view taken along a line VIII-VIII in a direction of arrows of FIG. 5.

As shown in FIG. 8, in a cross section CS2 parallel to the direction from rear surface 6 to front surface 5 and perpendicular to reference surface 13, an inclination angle φ2 of second rake face portion 42 relative to a plane 13c parallel to reference surface 13 may be greater than 5° and smaller than 40°. Inclination angle φ2 of second rake face portion 42 may be greater than 10° and smaller than 30°. Second rake face portion 42 is inclined relative to reference surface 13 so as to be decreased in height as distance from second cutting edge portion 2 increases. Bottom face 24 is lower than second cutting edge portion 2 in direction D2 perpendicular to reference surface 13. Preferably, inclination angle φ2 of second rake face portion 42 is smaller than inclination angle φ1 of first rake face portion 41.

Figure 9:
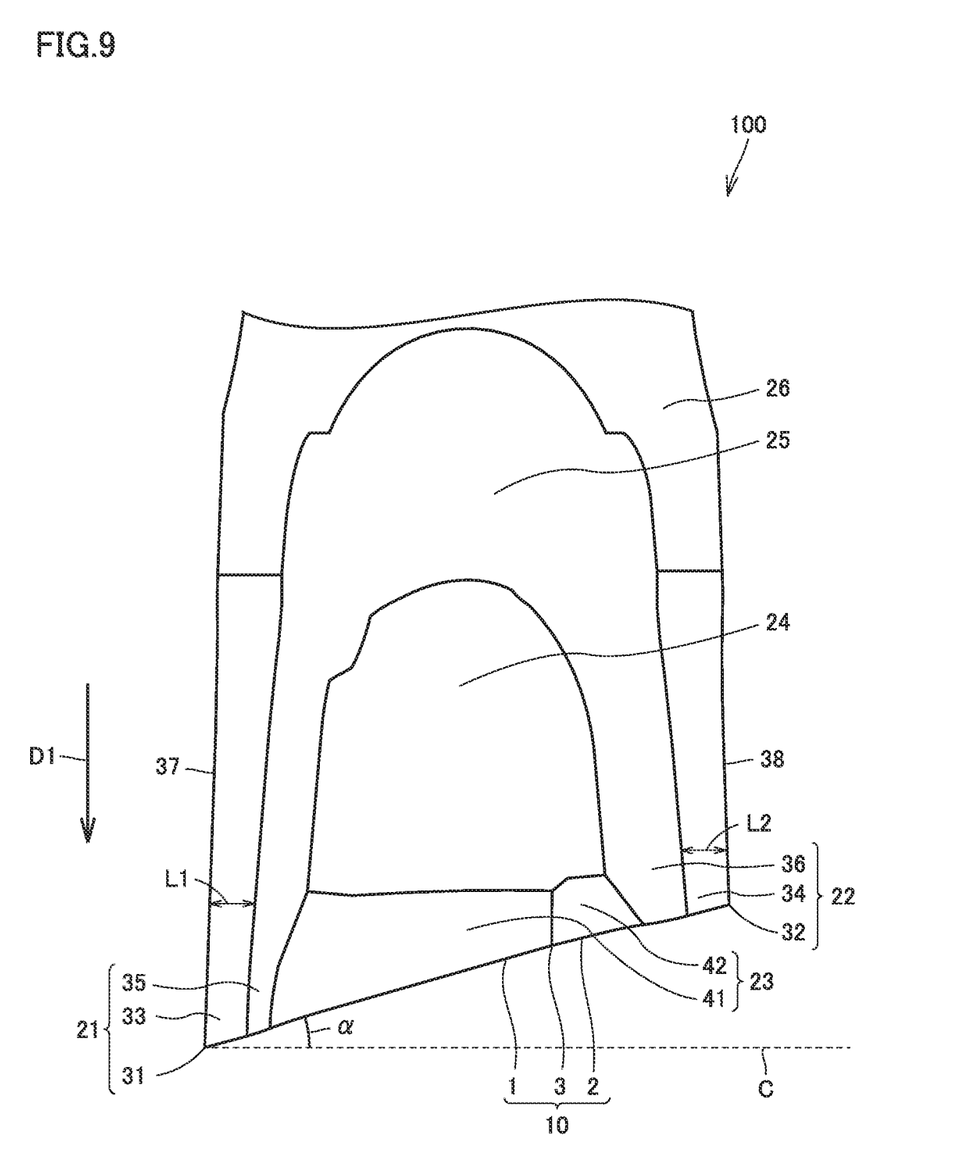
FIG. 9 is a partially enlarged schematic plan view showing the structure of a variation of the cutting-off processing tool according to the first embodiment.

As shown in FIG. 9, a width L1 of first upper end face 33 in a direction perpendicular to first ridgeline 37 between first upper end face 33 and first side surface 11 may be substantially equal to a width L2 of second upper end face 34 in a direction perpendicular to second ridgeline 38 between second upper end face 34 and second side surface 12. Width L1 of first upper end face 33 and width L2 of second upper end face 34 are 0.2 mm or more and 0.3 mm or less, for example. As shown in FIG. 5, width L1 of first upper end face 33 may be smaller than width L2 of second upper end face 34.

Next, a function and effect of cutting-off processing tool 100 according to the first embodiment will be described.

In accordance with cutting-off processing tool 100 according to the first embodiment, second front end 32 is lower than first front end 31 in the direction perpendicular to reference surface 13. This facilitates the evacuation of swarf in a direction from first cutting edge portion 1 to second cutting edge portion 2. As a result, the swarf is evacuated along a direction F2 parallel to cutting-off direction D1. Thus, damage to a processed surface of a workpiece 51 can be suppressed. Accordingly, the quality of the processed surface can be improved.

Moreover, in accordance with cutting-off processing tool 100 according to the first embodiment, first inclination angle θ1 of first cutting edge portion 1 relative to reference surface 13 may be smaller than second inclination angle θ2 of second cutting edge portion 2 relative to reference surface 13. This further facilitates the evacuation of the swarf in the direction from first cutting edge portion 1 to second cutting edge portion 2. As a result, damage to the processed surface of workpiece 51 can be further suppressed.

Furthermore, cutting-off processing tool 100 according to the first embodiment has bottom face 24 and rear inclined face 25 behind rake face 23. Accordingly, the swarf can be curled and thereby cut into short pieces.

Second Embodiment

Next, the structure of cutting-off processing tool 100 according to a second embodiment is described. In the following, different parts of the structure from cutting-off processing tool 100 according to the first embodiment are mainly described, and similar description will not be repeated.

Figure 10:
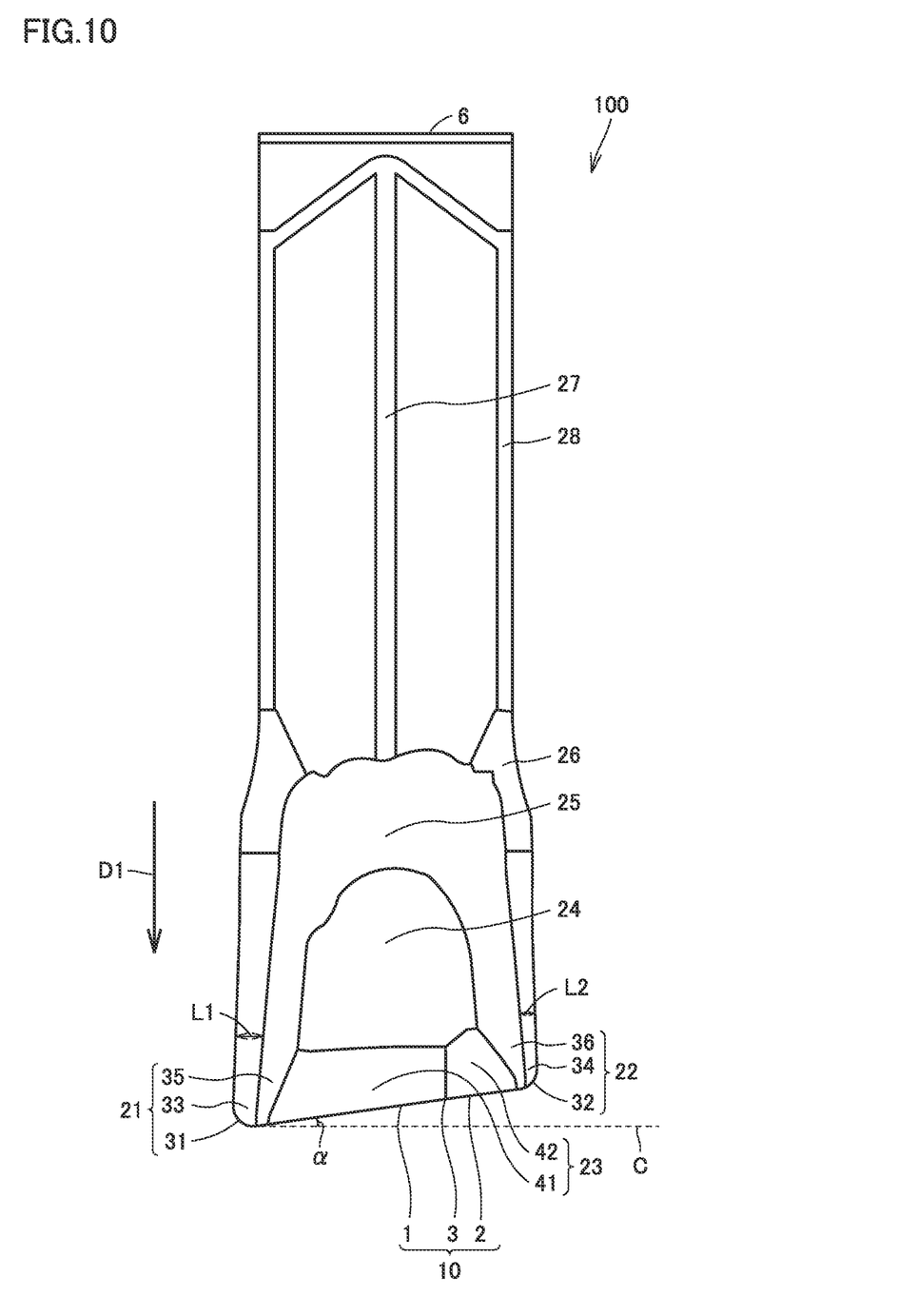
FIG. 10 is a schematic plan view showing the structure of a cutting-off processing tool according to a second embodiment.

As shown in FIG. 10, cutting edge 10 of cutting-off processing tool 100 according to the second embodiment is formed only at the front surface side, and does not need to be formed on the rear surface side. Rear inclined face 25 may be continuous with valley face 27. In top view, angle α formed between cutting edge 10 and plane C perpendicular to direction D1 from rear surface 6 to front surface 5 is 8°, for example.

In cutting-off processing tool 100 according to the second embodiment, width L1 of first upper end face 33 in the direction perpendicular to first ridgeline 37 between first upper end face 33 and first side surface 11 is greater than width L2 of second upper end face 34 in the direction perpendicular to second ridgeline 38 between second upper end face 34 and second side surface 12. Width L1 of first upper end face 33 is 0.3 mm, for example. Width L1 of first upper end face 33 may be 0.2 mm or more and 0.4 mm or less, for example. Width L2 of second upper end face 34 is 0.2 mm, for example. Width L2 of second upper end face 34 may be 0.1 mm or more and 0.3 mm or less, for example. A value obtained by dividing width L1 of first upper end face 33 by width L2 of second upper end face 34 is greater than 1.0 and smaller than 2.5, for example. The value obtained by dividing width L1 of first upper end face 33 by width L2 of second upper end face 34 may be greater than 1.2 and smaller than 2.0.

Cutting-off processing tool 100 according to the second embodiment produces a similar effect to that of cutting-off processing tool 100 according to the first embodiment. In cutting-off processing tool 100 according to the second embodiment, by setting the width of first upper end face 33 to be greater than the width of second upper end face 34, the rigidity of the first breaker projection can be made higher than the rigidity of the second breaker projection. As a result, breakage of the first breaker projection having first upper end face 33 can be suppressed.

Next, a method of using cutting-off processing tool 100 is described.

As shown in FIG. 11, workpiece 51 rotates around an axis of rotation 52. The workpiece is made of SCM 415 or SUS 316, for example. Cutting-off processing tool 100 is attached to a holder 101. A feed per revolution (f) of cutting-off processing tool 100 is 0.15 mm/revolution, for example. A cutting speed (Vc) of cutting-off processing tool 100 is 100 m/minute, for example. Cutting-off processing tool 100 is moved in a direction perpendicular to axis of rotation 52 of workpiece 51, to thereby cut workpiece 51. In accordance with cutting-off processing tool 100 according to each embodiment described above, the swarf evacuated from workpiece 51 is evacuated in direction F2 substantially parallel to cutting-off direction D1 of cutting-off processing tool 100. Accordingly, damage to a processed surface 53 of workpiece 51 by the swarf can be suppressed. Cutting-off processing tool 100 can be moved from an outer periphery of workpiece 51 to the vicinity of axis of rotation 52 along cutting-off direction D1, to thereby cut workpiece 51. The processing may be stopped before axis of rotation 52, to thereby form a groove in workpiece 51.

It should be understood that the embodiments disclosed herein are illustrative and non-restrictive in every respect. The scope of the present disclosure is defined by the terms of the claims, not by the description above, and is intended to include any modifications within the scope and meaning equivalent to the terms of the claims.

REFERENCE SIGNS LIST 1 first cutting edge portion; 2 second cutting edge portion; 3 boundary; 5 front surface; 6 rear surface; 10 cutting edge; 11 first side surface; 12 second side surface; 13 reference surface; 13a, 13b, 13c, A1, A2, C plane; 20 upper surface; 21 first breaker projection face; 22 second breaker projection face; 23 rake face; 24 bottom face; 25 rear inclined face; 26 first plane; 27 first valley face; 28 second plane; 31 first front end; 32 second front end; 33 first upper end face; 34 second upper end face; 35 first inclined face; 36 second inclined face; 37 first ridgeline; 38 second ridgeline; 41 first rake face portion; 42 second rake face portion; 51 workpiece; 52 axis of rotation; 53 processed surface; 100 cutting-off processing tool; CS1, CS2 cross section; D1, D2, F1, F2 direction.

The invention claimed is:

1. A cutting-off processing tool comprising:
   an upper surface;
   a front surface continuous with the upper surface;
   a rear surface opposite to the front surface;
   a first side surface continuous with both the upper surface and the front surface;
   a second side surface continuous with both the upper surface and the front surface and opposite to the first side surface; and
   a reference surface opposite to the upper surface and having a planar shape, wherein
   the upper surface includes a first breaker projection face extending along the first side surface, a second breaker projection face extending along the second side surface, and a rake face located between the first breaker projection face and the second breaker projection face in top view,
   a ridgeline between the rake face and the front surface includes a cutting edge,
   in a direction from the rear surface to the front surface, a first front end of the first breaker projection face is located ahead of a second front end of the second breaker projection face,
   the cutting edge has a first cutting edge portion continuous with the first breaker projection face and inclined relative to the reference surface, and a second cutting edge portion continuous with both the first cutting edge portion and the second breaker projection face and inclined relative to the reference surface,
   in a direction perpendicular to the reference surface, the second front end is lower than the first front end, and a boundary between the first cutting edge portion and the second cutting edge portion is lower than the second front end,
   the first cutting edge portion is inclined relative to the reference surface so as to be increased in height toward the first breaker projection face, and
   the second cutting edge portion is inclined relative to the reference surface so as to be increased in height toward the second breaker projection face.

2. The cutting-off processing tool according to claim 1, wherein
   the first breaker projection face has a first upper end face having a planar shape, and the second breaker projection face has a second upper end face having a planar shape, and
   a width of the first upper end face in a direction perpendicular to a ridgeline between the first upper end face and the first side surface is greater than a width of the second upper end face in a direction perpendicular to a ridgeline between the second upper end face and the second side surface.

3. The cutting-off processing tool according to claim 2, wherein
   a value obtained by dividing the width of the first upper end face by the width of the second upper end face is greater than 1.0 and smaller than 2.5.

4. The cutting-off processing tool according to claim 1, wherein
   in a direction parallel to the front surface and parallel to the reference surface, a width of the first cutting edge portion is greater than a width of the second cutting edge portion.

5. The cutting-off processing tool according to claim 4, wherein
   a value obtained by dividing the width of the first cutting edge portion by the width of the second cutting edge portion is greater than 1.2 and smaller than 6.0.

6. The cutting-off processing tool according to claim 1, wherein
   a first inclination angle of the first cutting edge portion relative to the reference surface is smaller than a second inclination angle of the second cutting edge portion relative to the reference surface.

7. The cutting-off processing tool according to claim 6, wherein
   a value obtained by dividing the second inclination angle by the first inclination angle is greater than 1.2 and smaller than 5.0.

8. The cutting-off processing tool according to claim 1, wherein
   a distance between the first front end and the second front end in the direction perpendicular to the reference surface is greater than 0.06 mm and smaller than 0.6 mm.

9. The cutting-off processing tool according to claim 1, wherein
   the rake face has a first rake face portion continuous with the first cutting edge portion, and
   in a cross section parallel to the direction from the rear surface to the front surface and perpendicular to the reference surface, an inclination angle of the first rake face portion relative to the reference surface is greater than 5° and smaller than 50°.

10. The cutting-off processing tool according to claim 1, wherein
    the rake face has a second rake face portion continuous with the second cutting edge portion, and
    in a cross section parallel to the direction from the rear surface to the front surface and perpendicular to the reference surface, an inclination angle of the second rake face portion relative to the reference surface is greater than 5° and smaller than 40°.

11. A cutting-off processing tool comprising:
    an upper surface;
    a front surface continuous with the upper surface;
    a rear surface opposite to the front surface;
    a first side surface continuous with both the upper surface and the front surface;
    a second side surface continuous with both the upper surface and the front surface and opposite to the first side surface; and
    a reference surface opposite to the upper surface and having a planar shape, wherein
    the upper surface includes a first breaker projection face extending along the first side surface, a second breaker projection face extending along the second side surface, and a rake face located between the first breaker projection face and the second breaker projection face in top view,
    a ridgeline between the rake face and the front surface includes a cutting edge, in a direction from the rear surface to the front surface, a first front end of the first breaker projection face is located ahead of a second front end of the second breaker projection face, the cutting edge has a first cutting edge portion continuous with the first breaker projection face and inclined relative to the reference surface, and a second cutting edge portion continuous with both the first cutting edge portion and the second breaker projection face and inclined relative to the reference surface, in a direction perpendicular to the reference surface, the second front end is lower than the first front end, and a boundary between the first cutting edge portion and the second cutting edge portion is lower than the second front end, the first breaker projection face has a first upper end face having a planar shape, and the second breaker projection face has a second upper end face having a planar shape, and a width of the first upper end face in a direction perpendicular to a ridgeline between the first upper end face and the first side surface is greater than a width of the second upper end face in a direction perpendicular to a ridgeline between the second upper end face and the second side surface.

12. The cutting-off processing tool according to claim 11, wherein
a value obtained by dividing the width of the first upper end face by the width of the second upper end face is greater than 1.0 and smaller than 2.5.

13. A cutting-off processing tool comprising:
an upper surface;
a front surface continuous with the upper surface;
a rear surface opposite to the front surface;
a first side surface continuous with both the upper surface and the front surface;
a second side surface continuous with both the upper surface and the front surface and opposite to the first side surface; and
a reference surface opposite to the upper surface and having a planar shape, wherein
the upper surface includes a first breaker projection face extending along the first side surface, a second breaker projection face extending along the second side surface, and a rake face located between the first breaker projection face and the second breaker projection face in top view,
a ridgeline between the rake face and the front surface includes a cutting edge,
in a direction from the rear surface to the front surface, a first front end of the first breaker projection face is located ahead of a second front end of the second breaker projection face,
the cutting edge has a first cutting edge portion continuous with the first breaker projection face and inclined relative to the reference surface, and a second cutting edge portion continuous with both the first cutting edge portion and the second breaker projection face and inclined relative to the reference surface,
in a direction perpendicular to the reference surface, the second front end is lower than the first front end, and a boundary between the first cutting edge portion and the second cutting edge portion is lower than the second front end, and
in a direction parallel to the front surface and parallel to the reference surface, a width of the first cutting edge portion is greater than a width of the second cutting edge portion.

14. The cutting-off processing tool according to claim 13, wherein
a value obtained by dividing the width of the first cutting edge portion by the width of the second cutting edge portion is greater than 1.2 and smaller than 6.0.

15. A cutting-off processing tool comprising:
an upper surface;
a front surface continuous with the upper surface;
a rear surface opposite to the front surface;
a first side surface continuous with both the upper surface and the front surface;
a second side surface continuous with both the upper surface and the front surface and opposite to the first side surface; and
a reference surface opposite to the upper surface and having a planar shape, wherein
the upper surface includes a first breaker projection face extending along the first side surface, a second breaker projection face extending along the second side surface, and a rake face located between the first breaker projection face and the second breaker projection face in top view,
a ridgeline between the rake face and the front surface includes a cutting edge,
in a direction from the rear surface to the front surface, a first front end of the first breaker projection face is located ahead of a second front end of the second breaker projection face,
the cutting edge has a first cutting edge portion continuous with the first breaker projection face and inclined relative to the reference surface, and a second cutting edge portion continuous with both the first cutting edge portion and the second breaker projection face and inclined relative to the reference surface,
in a direction perpendicular to the reference surface, the second front end is lower than the first front end, and a boundary between the first cutting edge portion and the second cutting edge portion is lower than the second front end, and
a first inclination angle of the first cutting edge portion relative to the reference surface is smaller than a second inclination angle of the second cutting edge portion relative to the reference surface.

16. The cutting-off processing tool according to claim 15, wherein
a value obtained by dividing the second inclination angle by the first inclination angle is greater than 1.2 and smaller than 5.0.

* * * * *